US006253792B1

(12) United States Patent  
Williams et al.

(10) Patent No.: US 6,253,792 B1  
(45) Date of Patent: Jul. 3, 2001

(54) EXHAUST PROCESSOR END CAP

(75) Inventors: Ronald S. Williams, Columbus, IN (US); Mick Wadsworth, Garstang (GB)

(73) Assignee: ArvinMeritor, Inc., Troy, MI (US)

( * ) Notice: Subject to any disclaimer, the term of this patent is extended or adjusted under 35 U.S.C. 154(b) by 0 days.

(21) Appl. No.: 09/529,104

(22) PCT Filed: Oct. 7, 1998

(86) PCT No.: PCT/US98/21083

§ 371 Date: Jun. 14, 2000

§ 102(e) Date: Jun. 14, 2000

(87) PCT Pub. No.: WO99/18358

PCT Pub. Date: Apr. 15, 1999

Related U.S. Application Data (60) Provisional application No. 60/074,858, filed on Feb. 17, 1998, provisional application No. 60/074,856, filed on Feb. 17, 1998, provisional application No. 60/061,294, filed on Oct. 7, 1997, and provisional application No. 60/061,291, filed on Oct. 7, 1997.

(51) Int. Cl.[7] .................................................... F15D 1/02
(52) U.S. Cl. ............................ 138/39; 138/177; 138/178; 55/DIG. 30
(58) Field of Search .................................... 138/39, 96 R, 138/177, 178; 422/177, 179, 180, 211, 222; 55/523, 516, DIG. 30; 60/299

(56) References Cited

U.S. PATENT DOCUMENTS

| | | |
|---|---|---|
| 1,302,300 * | 4/1919 | Brinkman . |
| 3,159,239 | 12/1964 | Andrews . |
| 3,308,853 * | 3/1967 | O'Brien . |
| 3,934,618 * | 1/1976 | Henderson . |
| 3,972,687 | 8/1976 | Frietzsche . |
| 3,984,207 | 10/1976 | Abthoff et al. . |
| 4,070,158 | 1/1978 | Siebels . |
| 4,144,627 | 3/1979 | Noda et al. . |
| 4,155,980 | 5/1979 | Santiago et al. . |
| 4,160,010 | 7/1979 | Ottle . |
| 4,163,042 | 7/1979 | Lynch . |
| 4,180,544 | 12/1979 | Santiago . |
| 4,246,464 | 1/1981 | Altstetter . |
| 4,278,639 | 7/1981 | Takokoro et al. . |
| 4,282,186 | 8/1981 | Nonnemann et al. . |
| 4,335,077 | 6/1982 | Santiago et al. . |
| 4,344,921 | 8/1982 | Santiago et al. . |
| 4,344,922 | 8/1982 | Santiago et al. . |
| 4,347,219 | 8/1982 | Noritake et al. . |
| 4,400,860 | 8/1983 | Nonnenmann et al. . |
| 4,519,120 | 5/1985 | Nonnenmann et al. . |
| 4,782,570 | 11/1988 | Spridco . |
| 4,969,264 | 11/1990 | Dryer et al. . |
| 5,118,476 | 6/1992 | Dryer et al. . |
| 5,145,539 | 9/1992 | Horikawa et al. . |
| 5,183,299 * | 2/1993 | Hallerstrom et al. . |
| 5,387,399 | 2/1995 | Nishida et al. . |
| 5,408,828 | 4/1995 | Kreucher et al. . |
| 5,683,660 | 11/1997 | Wirth et al. . |
| 6,158,120 * | 12/2000 | Foster et al. .................... 422/177 |

FOREIGN PATENT DOCUMENTS

| | | |
|---|---|---|
| 3430-398 A1 | 2/1986 | (DE) . |
| 4244-315 A1 | 3/1994 | (DE) . |
| 2 290 036 | 12/1995 | (GB) . |

* cited by examiner

Primary Examiner—James Hook
(74) Attorney, Agent, or Firm—Barnes & Thornburg (57) ABSTRACT

An exhaust processor is provided having an exhaust processor body, first, and second end caps. The exhaust processor body includes an outer shell and a substrate positioned to lie within the outer shell. The outer shell includes an outer surface facing away from the substrate, an inner surface facing toward the substrate, spaced apart first and second ends. The inner surface of the outer shell defines a first end cap region at the first end, a second end cap region at the second end, and an inner surface side. The first end cap is positioned to lie in the first end cap region, and the second end cap is positioned to lie in the second end cap region. Each of the first and second end caps include a crimpable flange that is sizable to include a size substantially equal to the inner surface size of the inner surface of the outer shell.

28 Claims, 10 Drawing Sheets

EXHAUST PROCESSOR END CAP

This application is a 371 of PCT/US 98/21083 filed Oct. 7, 1998 which claims benefit of 60,061,291 filed Oct. 7, 1998 which claims benefit of 60,061,294 filed Oct. 7, 1998 which claims benefit of 60,074,856 filed Feb. 17, 1998 which claims benefit of 60,074,858 filed Feb. 19, 1998.

The present invention relates to end caps that arc coupled to a body, and particularly to end caps for use in vehicle exhaust processors. More particularly, the present invention relates to end caps that are sized to mate with a shell containing an exhaust processor substrate therein.

Exhaust processors are part of a vehicle exhaust system that, in general "cleans" and "quiets" exhaust gas produced by a vehicle engine before the exhaust gas is discharged from an engine system to the atmosphere. An exhaust processor typically includes an exhaust processor body and end caps which close the ends of the exhaust processor body. The size of each exhaust processor body varies to fit a certain vehicle specification and thus an end cap must be able to fit on exhaust processor bodies of various sizes.

In accordance with the present invention, an exhaust processor is provided having an exhaust processor body and first and second end caps. The exhaust processor body includes an outer shell and a substrate positioned to lie within the outer shell. The outer shell includes an outer surface facing away from the substrate, an inner surface facing toward the substrate, and spaced apart first and second ends. The inner surface of the outer shell defines a first end cap region at the first end, a second end cap region at the second end, and a inner surface size. The first end cap is positioned to lie in the first end cap region. The second end cap is positioned to lie in the second end cap region. Each of the first and second end caps include a crimpable flange that is sizable to include a size substantially equal to the inner surface size of the inner surface of the outer shell.

A mat made of an intumescent material is positioned to lie between the outer shell and the substrate. The first and second end caps are arranged to abut or lie very close to the mat and the substrate so that the mat is not exposed to mat-degrading exhaust gas passing through the exhaust processor body.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
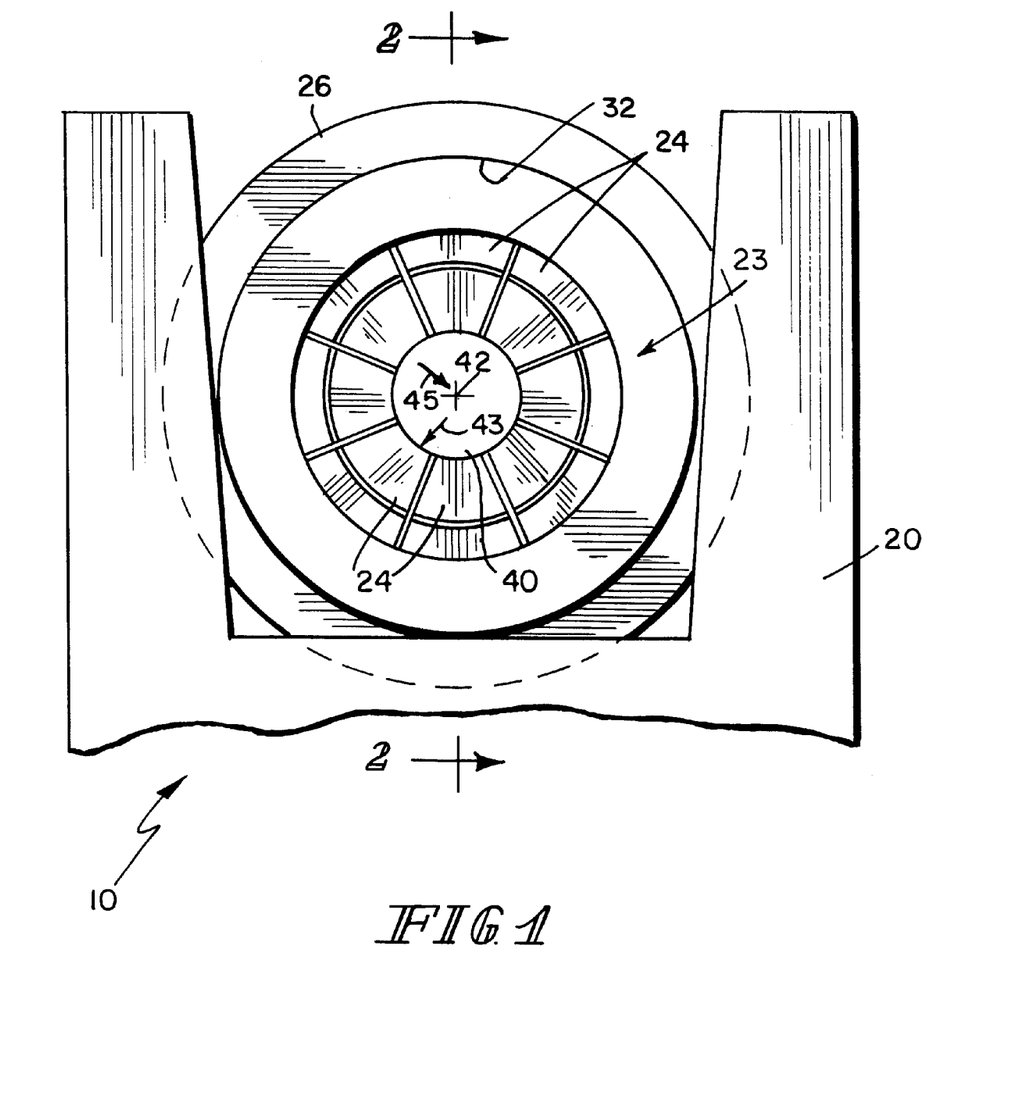
FIG. 1 is an end elevational view of an end cap sizer.

An end cap sizer 10 is shown in FIG. 1. The end cap sizer 10 sizes an end cap 14, 16 to fit a exhaust processor body 12 as shown in FIGS. 4–7. The end cap sizer 10 sizes end caps 14, 16 by treating, working, or operating end caps 14, 16 to make end caps 14, 16 a particular size.

The size of exhaust processor bodies 12 vary within a fairly wide tolerance. The end cap sizer 10 determines the size of a particular exhaust processor body 12 and then sizes an end cap 14, 16 accordingly so that end cap 14, 16 will mate with, match, fit into, and otherwise conform to the exhaust processor body 12. Thus, end cap sizer 10 creates a matched pair of end cap 14, 16 and exhaust processor body 12 so that end cap 14, 16 and exhaust processor body 12 may be assembled easily. To form a completed exhaust processor 18, two end caps 14, 16 are coupled to opposite ends of exhaust processor body 12 as shown, for example, in FIG. 7.

Figures 13, 14:
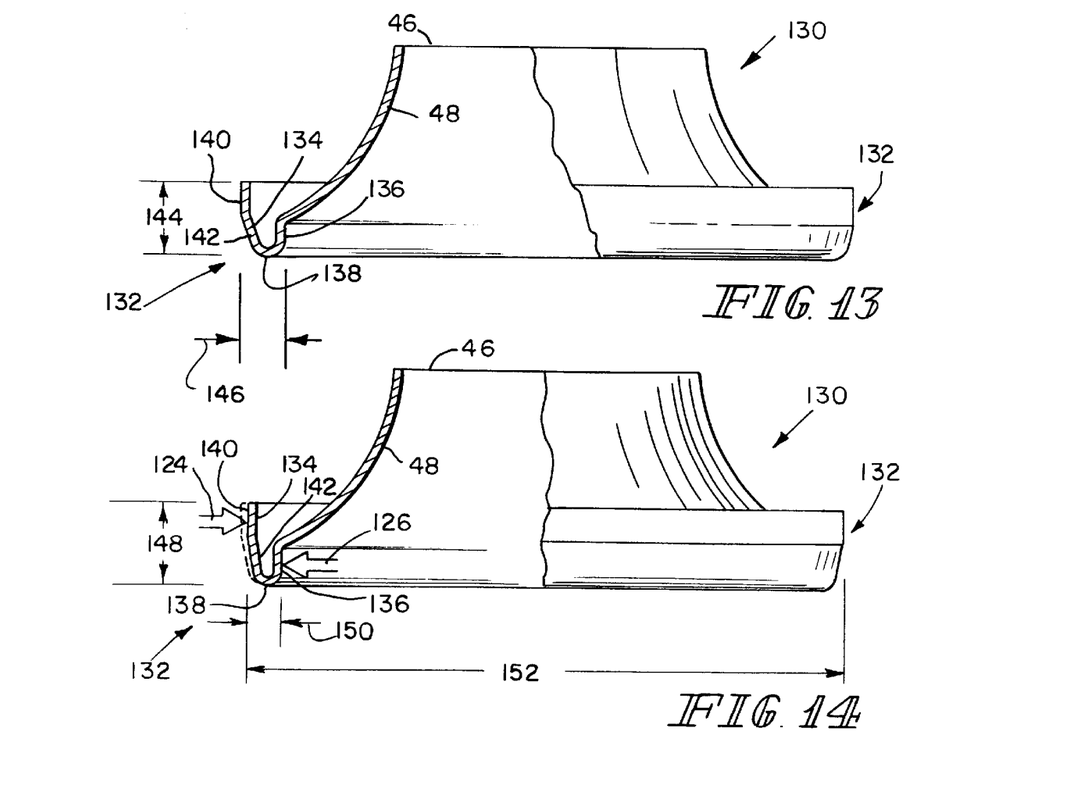
FIG. 13 is a sectional view of another embodiment of an end cap showing the end cap having a crimpable flange that differs from the crimpable flange shown in the end cap of FIGS. 6–12.
FIG. 14 is a sectional view of the end cap of FIG. 13 showing a crimping force being applied to the crimpable flange to move the crimpable flange to a crimped position.

A first embodiment of an end cap configured to be coupled to exhaust processor body 12 is shown in FIGS. 7–12 and a second embodiment of an end cap is shown in FIGS. 13 and 14. Because end caps 14, 16 can abut or be positioned to lie very close to mat 17 and substrate 15, mat 17 is not exposed to mat-degrading exhaust gas passing through exhaust processor body 17 as shown, for example, in FIGS. 7, 9, and 12. Exhaust processor body 12 includes a substrate 15, a mat 17 made of an intumescent material, and an outer shell 31.

It is within the scope of this disclosure to use sizer 10 to size components other than end caps to fit within bodies configured to receive such components. The invention is especially, but not exclusively, suitable for use in the production of exhaust processors 18. In this application, the words "exhaust processor" are intended to refer to various types of diesel particulate filters and other traps, purifiers or substrates in connection with which this invention may be used. In the illustrated embodiment, the words "exhaust processor" specifically refer to a catalytic device (for example, a catalytic converter or a catalytic trap) for use with gasoline engines.

Figure 2:
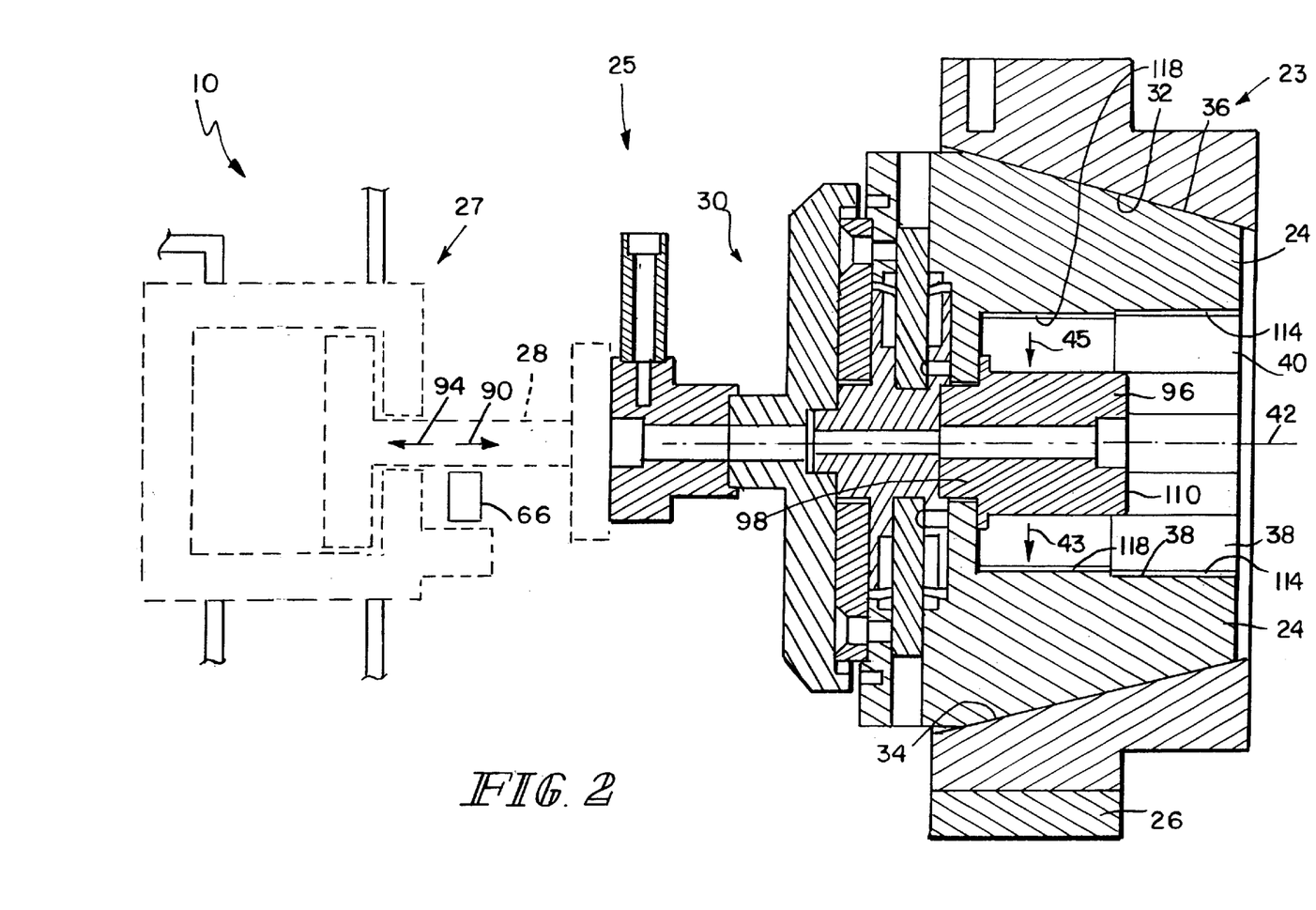
FIG. 2 is a sectional view taken along line 2—2 of FIG. 1.
Figure 3:
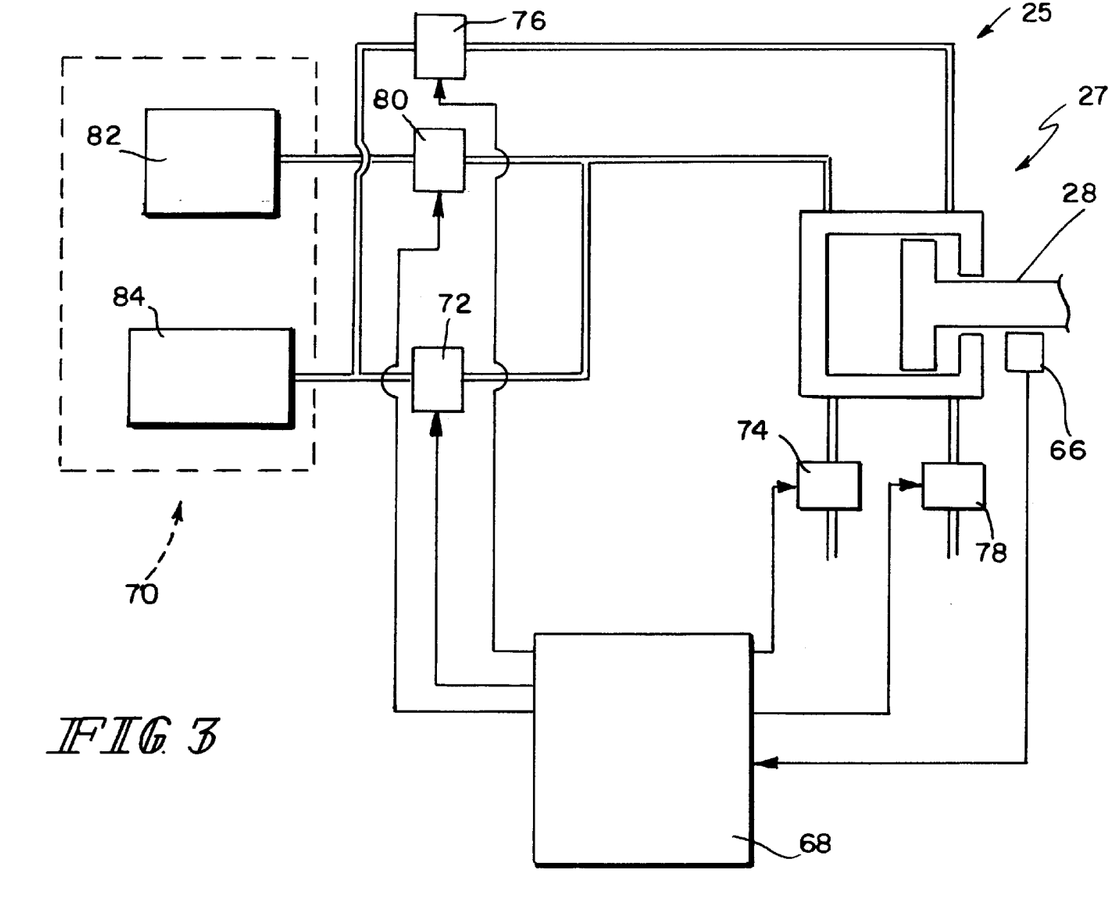
FIG. 3 is a block diagram of a control system of the end cap sizer.

End cap sizer 10 includes a frame 20, a device 23 that obtains a body measurement of a body 12 and sizes an end cap 14, 16 based on the body measurement, and a control system 25 that moves device 23 to the necessary positions to receive body 12 and end cap 14, 16, obtain a measurement of exhaust processor body 12, and size end cap 14, 16. The device 23 is a single tool that includes measurer and sizer jaws 24 and a stationary portion 26 mounted on frame 20. Control system 25 includes an actuator 28, a mechanical linkage 30 that connects actuator 28 and jaws 24, and a position controller 27 as shown, for example, in FIGS. 1–3.

Movement of actuator 28 causes jaws 24 to open or close as jaws 24 move relative to stationary portion 26 The stationary portion 26 is mounted or fixed to frame 20 so that movement of actuator 28 and jaws 24 do not cause movement of stationary portion 26. Actuator 28 is a hydraulic power input cylinder. Actuator 28 could be any type of mechanism that causes jaws 24 to open and close such as, for example, any of various electric, hydraulic, or pneumatic mechanisms. Mechanical linkage 30 can be any type of linkage that connects jaws 24 and actuator 28.

Stationary portion 26 is formed to include a cone-shaped inner surface 32 that defines an opening 34 through which jaws 24 are moved by actuator 28. The frame 20 may be formed to include a jaw-receiving opening so that a separate stationary portion is not required.

The jaws 24 include a cone-shaped outer surface 36 that abuts cone-shaped inner surface 32 of stationary portion 26. Movement of jaws 24 through opening 34 defined by inner surface 32 causes jaws 24 to open and close about a longitudinal axis 42 of end cap sizer 10. The outer surface 36 of jaws 24 and inner surface 32 of stationary portion 26 may be of any shape that permit jaws 24 to open and close as jaws 24 move through opening 32 formed in stationary portion 26.

The jaws 24 further include an inner surface 38 that defines a cavity 40 sized to receive an exhaust processor body 12 or an end cap 14, 16, measure exhaust processor body 12, and size end cap 14, 16. The inner surface 38 of jaws 24 moves outwardly in direction 43 and inwardly in direction 45 relative to longitudinal axis 42 as jaws 24 open and close, respectively. The jaws 24 perform the different functions of receiving the body 12 or cap 14, 16, measuring body 12, and sizing end cap 14, 16 by opening and closing as the jaws 24 are moved relative to stationary portion 26. The jaws 24 receive the body 12 or cap 14 by actuator 28 opening jaws 24 in direction 43 so that body 12 or cap 14 fit into cavity 40 defined by inner surface 38 of jaws 24. The jaws 24 measure body 12 by actuator 28 closing jaws 24 in direction 45 so that inner surface 38 of jaws 24 abuts body 12. The jaws 24 end cap 14, 16 by actuator closing jaws 24 in direction 45 so that inner surface 38 of jaws 24 compresses end cap 14, 16.

The position controller 27 of end cap sizer 10 controls the movement of actuator 28 and jaws 24 relative to stationary portion 26. The position controller 27 also controls the amount of pressure applied by actuator 28 and jaws 24 to end cap 14, 16 and exhaust processor body 12. The position controller 27 includes a position sensor 66, a position memory controller 68, a hydraulic power pack 70, and a plurality of valves 72, 74, 76, 78, 80. Position memory controller 68 opens and closes valves 72, 74, 76, 78, 80 at the proper time to provide proper movement of actuator 28 and jaws 24 relative to stationary portion 26.

The hydraulic power pack 70 includes a high-pressure system 82 and a low-pressure system 84. Each of the high and low-pressure systems 82, 84 include a reservoir (not shown) and a pump (not shown). Any type of conventional reservoir, pump, valve, controller, and position sensor (for example, a linear potentiometer) may be used in control system 25.

Figure 4:
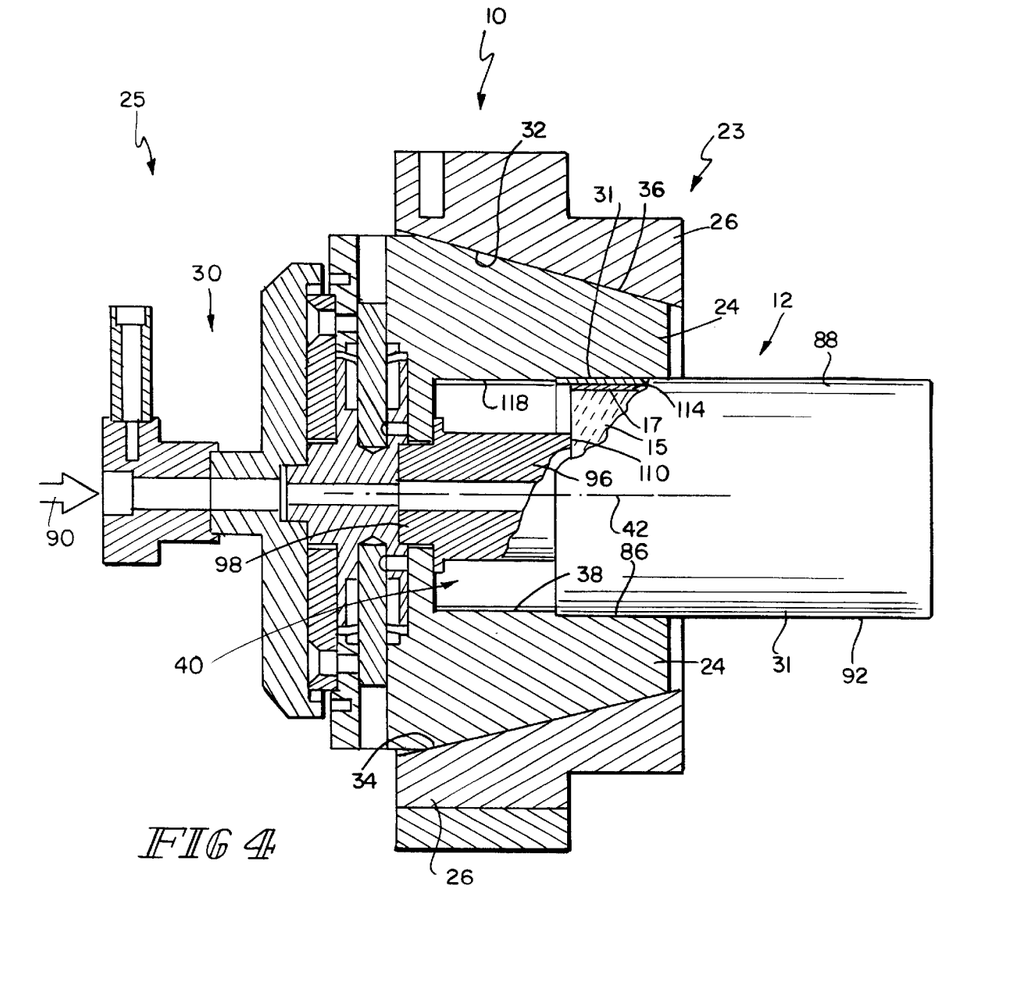
FIG. 4 is a sectional view similar to FIG. 2 showing an exhaust processor body inserted into the end cap sizer and the end cap sizer measuring the exhaust processor body.

The end caps 14, 16 are sized to match, mate, and fit into exhaust processor body 12 according to the following method. First, an end 86 of exhaust processor body 12 is inserted into cavity 40 defined by inner surface 38 of jaws 24. As shown in FIG. 4, the actuator 28 advances jaws 24 in direction 90 through opening 34 formed in stationary portion 26 to close jaws 24 in direction 45 until inner surface 38 of jaws 24 abuts an outer surface 92 of exhaust processor body 12.

Figure 5:
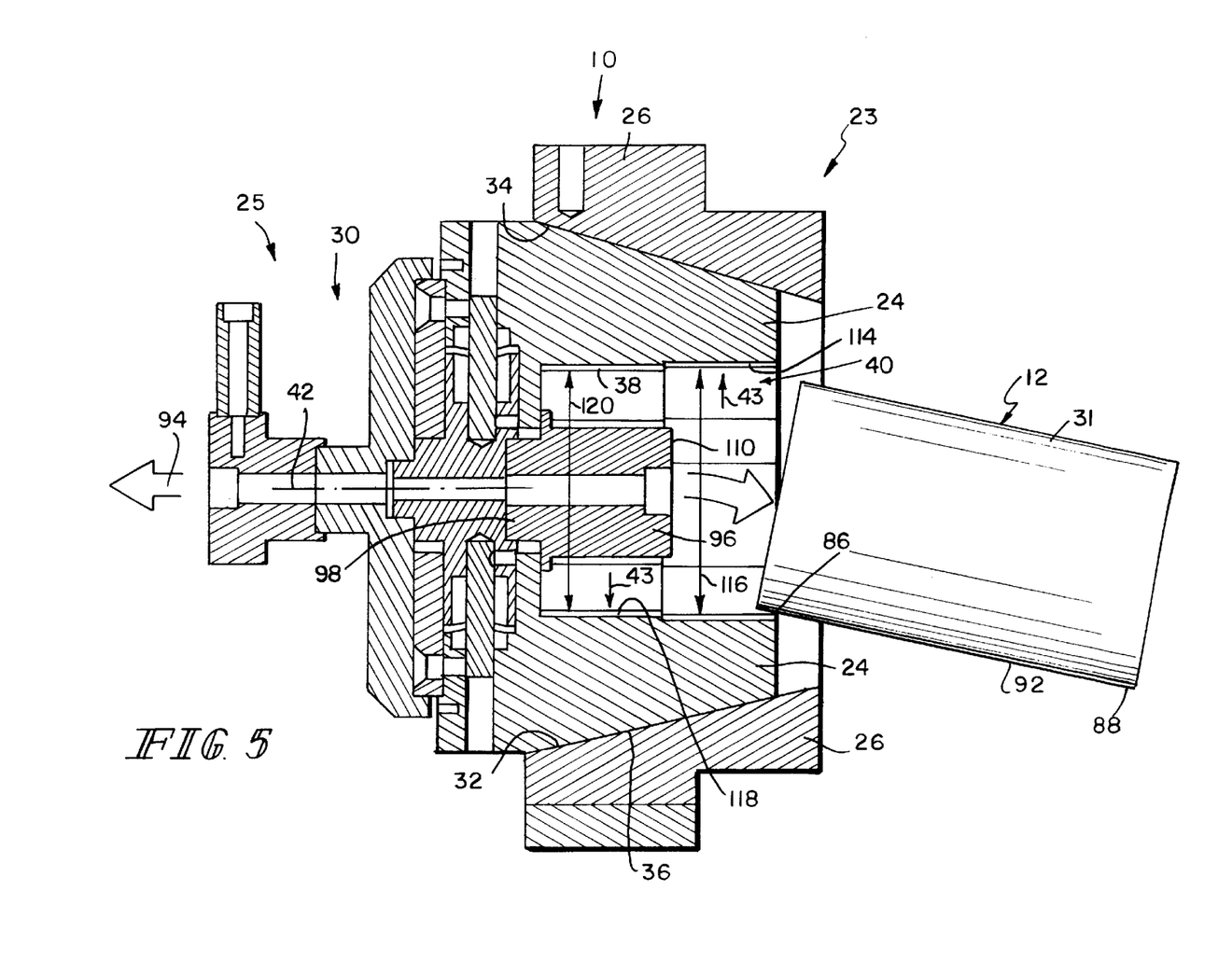
FIG. 5 is a sectional view similar to FIG. 4 showing the end cap sizer releasing the exhaust processor body so that the exhaust processor can be removed from the end cap sizer.

The position memory controller 68 opens valves 72, 78 and closes valve 74 so that the low-pressure system 84 moves actuator 28 and thus jaws 24 relative to stationary portion 26. The low-pressure system 84 is used so that jaws 24 only touch outer surface 92 of exhaust processor body 12 to measure an outer diameter 22 of exhaust processor body 12 and do not significantly deform any portion of exhaust processor body 12. If desired, the low pressure may be sufficient to smooth out any rough surface deformation if, for example, exhaust processor body 12 is slightly non-circular. Using a measurement taken by position sensor 66, the position memory controller 68 memorizes the position of actuator 28 and jaws 24. Next, the position memory controller 68 closes valves 72, 78 and opens valves 74, 76 so that cylinder 28 and jaws 24 retract in direction 94 so that jaws 24 open in direction 43 to release the exhaust processor body 12 to permit a user to remove exhaust processor body 12 from end cap sizer 10 as shown in FIG. 5.

Figure 6:
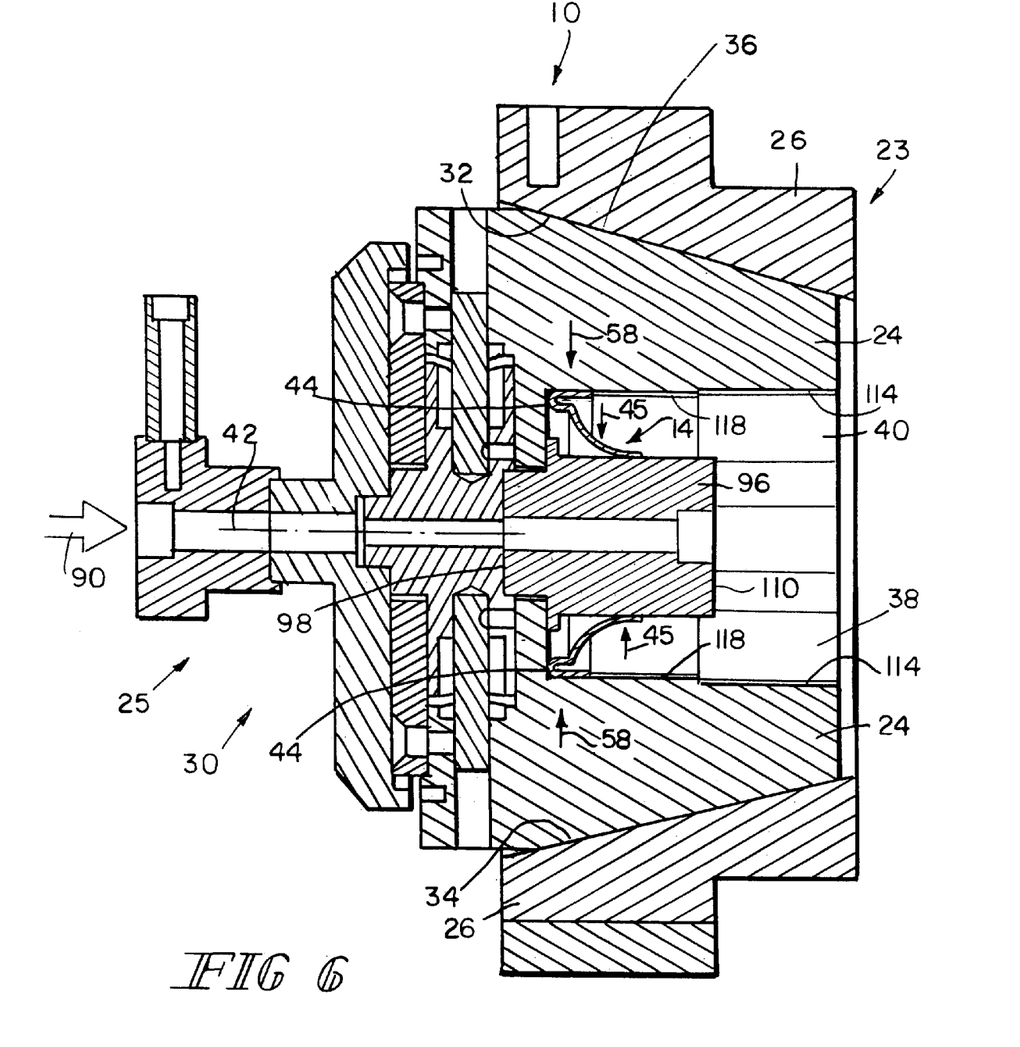
FIG. 6 is a sectional view similar to FIG. 5 showing an end cap positioned to lie in the end cap sizer and the end cap sizer sizing the end cap so that the end cap will fit into the end of the exhaust processor body measured in FIG. 4.

End cap sizer 10 further includes a projection 96 having a first end 98 coupled to mechanical linkage 30 and a second end 110 spaced apart and positioned to lie in cavity 40 formed in jaws 24. As shown in FIG. 6, end cap 14, 16 slides over projection 96 to assist in centering end cap 14, 16 within cavity 40. The end cap 14, 16 is placed in cavity 40 formed in jaws 24 and actuator 28 and jaws 24 are advanced in direction 90 under high pressure so that jaws 24 close in direction 45 around end cap 14, 16 as shown in FIG. 6.

Position memory controller 68 opens valves 78, 80 and closes valves 74, 76 to cause high-pressure system 82 to supply high-pressure fluid to actuator 28 The high-pressure fluid is used to provide the necessary force for jaws 24 to size end cap 14, 16. The position memory controller 68 cooperates with position sensor 66 to move actuator 28 and thus jaws 24 to the position previously memorized by position memory controller 68 for the measurement of end 86 of exhaust processor body 12. By returning jaws 24 to this same position, the jaws 24 size end cap 14, 16 into the proper shape to fit into end 86 of exhaust processor body 12 previously measured.

Once end cap 14, 16 is sized, actuator 28 and jaws 24 retract in direction 94 so that jaws 24 open in direction 43 and an operator may remove end cap 14, 16 from end cap sizer 10. More specifically, the position memory controller opens valves 74, 76 and closes valves 78, 80 to cause actuator 28 and jaws 24 to retract in direction 94.

The process of measuring end 86 of exhaust processor body 12 and sizing an end cap 14 accordingly is repeated for an opposite end 88 of exhaust processor body 12 and its mating end cap 16. The end caps 14, 16 cannot be sized based on the measurement of only one end 86, 88 of exhaust processor body 12 because of potential dimensional differences between the ends 86, 88 of exhaust processor body 12.

The steps of measuring converter body 12 and sizing end cap 14, 16, may take place simultaneously, sequentially, or in any other timing sequence. For example, the end cap 14, 16 may be sized while converter body 12 is measured or converter body 12 may be measured and information relating to the sizing measurement may be stored and later used to size end cap 14, 16.

The step of measuring exhaust processor body 12 may be performed using a mechanical device, laser measurement device, proximity measurement device, or any other type of measurement device that can measure a diameter of exhaust processor body 12. The step of sizing end cap 14, 16 may be performed using a mechanical device or any other type of device than can size end cap 14, 1 6.

Figure 7:
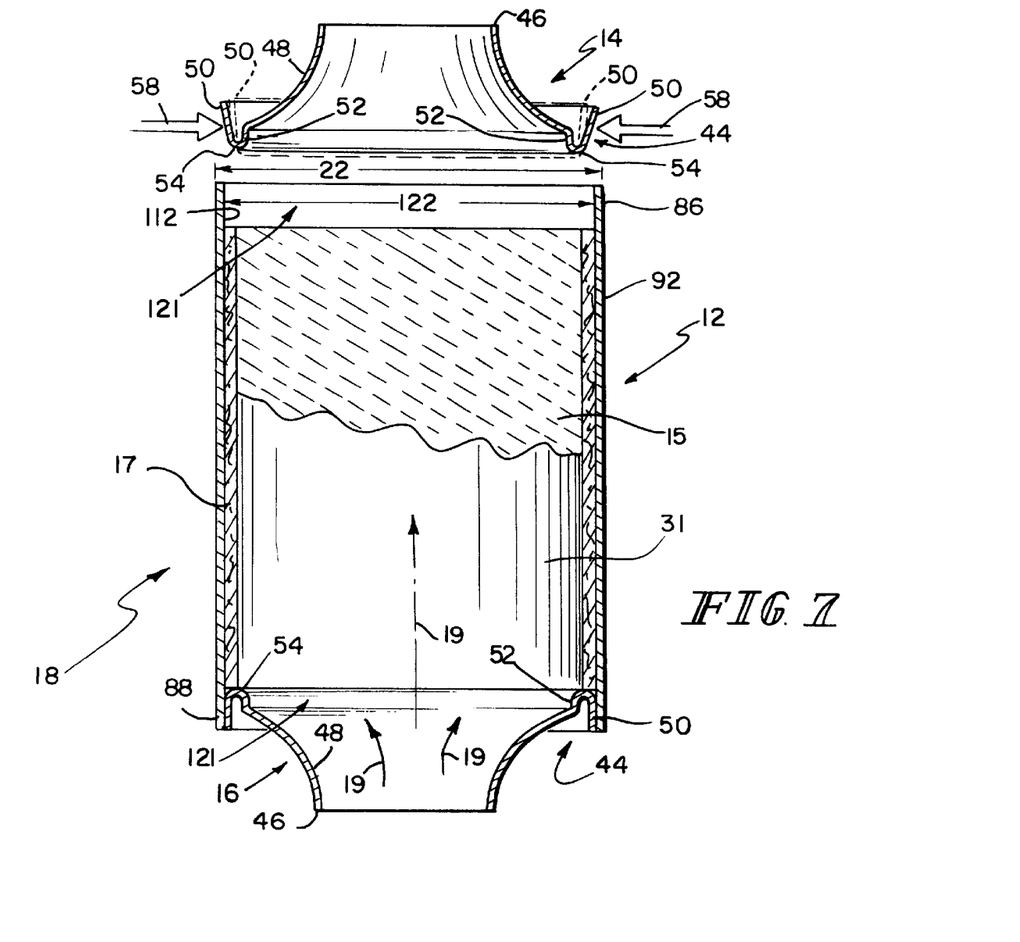
FIG. 7 is an exploded side elevational view, with portions cutaway, of an exhaust processor having first and second end caps and an exhaust processor body showing the first end cap being positioned to lie away from the exhaust processor body and the first end cap having a crimpable flange that is moved from a first position (solid lines) to a second crimped position (phantom lines) by the end cap sizer shown in FIGS. 1–6 so that the first end cap matches the exhaust processor body and the end cap can be pushed into the exhaust processor body.
Figure 8:
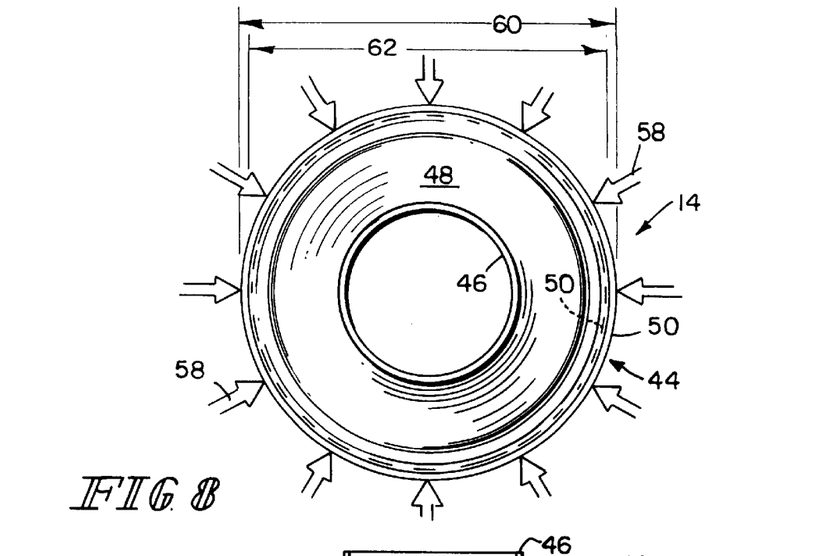
FIG. 8 is a top plan view of the first end cap of FIG. 7 showing the crimpable flange in the first position (solid lines) and the second crimped position (phantom lines) after the end cap sizer applies a crimping force to the crimpable flange.
Figure 9:
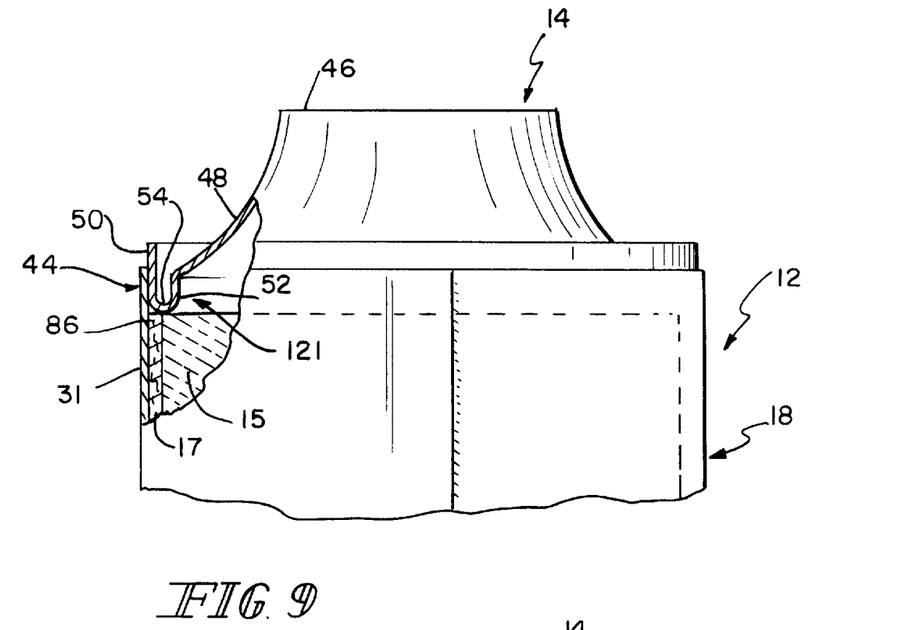
FIG. 9 is partial side elevational view, with portions cutaway, showing the exhaust processor body including a substrate, a mat wrapped around the substrate, and an outer shell wrapped around the mat and substrate and the crimpable flange of the end cap being in its second crimped position and positioned to lie in abutting relation to the mat and substrate.

As shown in FIG. 7, exhaust processor body 12 includes a substrate 15, a mat 17, and an outer shell 31. Substrate 15 is a ceramic substrate that has a contour tolerance of ±0.8 mm which gives the exhaust processor body 12 a variable outer diameter 22 range of 3.2 mm. The substrate 15 may be made of a metal material or other appropriate material. The mat 17 will also vary with a tolerance of ±10%, for example, for an intumescent mat. The combination of these variables for a final assembly with a 3100 g/m$^2$ and 118.4 mm diameter substrate 15 provides an exhaust processor body 12 diameter 22 range of 122.2 mm to 126.6 mm. The end cap sizer 10 enables end caps 14, 16 to be made to an optimum size to suit each unique exhaust processor body 12.

Exhaust processor 18 is formed when end caps 14, 16 are coupled to exhaust processor body 12. A method and apparatus for producing an exhaust processor is disclosed in U.S. Provisional Application No. 60/074,856 filed Feb. 17, 1998 which is hereby incorporated by reference herein. Exhaust processor 18 is placed in a vehicle exhaust system (not shown) so that exhaust gas flows in direction 19 trough substrate 15. The substrate 15 cleans the exhaust gas before the exhaust gas is discharged to the atmosphere.

As shown in FIG. 7, end caps 14, 16 slide into the exhaust processor body 12 and abut an inner surface 112 of outer shell 31. Inner surface 112 of outer shell 31 defines an end cap region 121 at each end 86, 88 of exhaust processor body 12. The inner surface 112 of outer shell also defines an inner diameter 122 which dictates the size of the end cap 14, 16 to be mated with exhaust processor body 12. As discussed above, jaws 24 measure the outer diameter 22 of the outer shell 31 instead of the inner diameter 122 of inner surface 112. The end cap sizer 10 accounts for the thickness (difference between the inner and outer diameters 112, 22) of outer shell 31 of exhaust processor body 12 because end cap 14, 16 has to be sized to fit into end cap region 121 of exhaust processor body 12 defined by inner surface 112 of outer shell 31 as shown in FIG. 7.

The end cap sizer 10 includes two means for accounting for the thickness of outer shell 31. First, the position memory controller 68 may compensate for the outer shell 31 thickness by moving actuator 28 and jaws 24 further forward in direction 90 when jaws 24 are sizing end cap 14, 16. The further jaws 24 move in direction 90, the more jaws 24 close in direction 45 to further compress end cap 14, 16. Second, inner surface 38 of jaws 24 includes a first region 114 having a first diameter 116 and a second region 118 having a second diameter 120 that is less than first diameter 116 as shown, for example, in FIG. 5. The exhaust processor body 12 is measured by the larger diameter first region 114 and end cap 14, 16 is sized by the smaller diameter second region 118. The exhaust processor body 12 cannot extend into second region 118 because substrate 15 abuts second end 110 of projection 96 when exhaust processor body 12 is inserted into cavity 40 as shown in FIG. 4. Either or both of above-mentioned means for accounting for outer shell 31 thickness may be used.

Referring to FIG. 7, each cad cap 14, 16 includes a crimpable annular flange 44 that extends into exhaust processor body 12, a pipe-mating end 46 spaced apart from crimpable flange 44, and a flared body portion 48 extending between crimpable flange 44 and pipe-mating end 46 as shown, for example, in FIGS. 7–12. Crimpable flange 44 includes annular first and second portions 50, 52 and an annular rounded end 54 extending between first and second portions 50, 52. During sizing of end cap 14, 16, crimpable flange 44 is deformed and moved from a solid-line position to, for example, a phantom-line position as shown in FIG. 7 wherein the phantom-line position is determined by the diametrical size of the portion of exhaust processor body 12 embracing crimpable flange 44.

When end cap 14, 16 is positioned in exhaust processor body 12, first portion 50 of crimpable flange 44 engages inner surface 112 of outer shell 31 and rounded end 54 of crimpable flange 44 abuts axially outer ends of mat 17 and substrate 15 as shown for example, in FIG. 7. Second portion 52 of crimpable flange 44 is appended to body potion 48 of crimpable flange 44. Body portion 48 has a horn-like shape, annular first and second portions 50, 52 have cylindrical shapes, and annular rounded end 54 has a rolled, ring-like shape.

The end cap sizer 10 sizes end cap 14, 16 so that end cap 14, 16 will fit into and otherwise conform to exhaust processor body 12 by applying a crimping force to crimpable flange 44. The crimping force includes a radially-inwardly directed force 58 applied by inner surface 38 of jaws 24 to first portion 50 of crimpable flange 44 that moves first portion 50 of crimpable flange 44 toward second portion 52 of crimpable flange 44 as shown, for example, in FIG. 6.

The end cap 14, 16 is made initially oversize, and is then compressed so that end cap 14, 16 can fit into processor body 12. Before the crimping force 58 is applied to crimpable flange 44, end cap 14, 16 includes a diameter 60 that is too large to fit into exhaust processor body 12 After crimping force 58 is applied to crimpable flange 44, end cap 14, 16 includes a diameter 62 that matches (i.e. corresponds to) inner diameter 122 of outer shell 31 of exhaust processor body 12 so that end cap 14. 16 may fit into end cap region 121 of exhaust processor body 12.

Figures 10, 11:
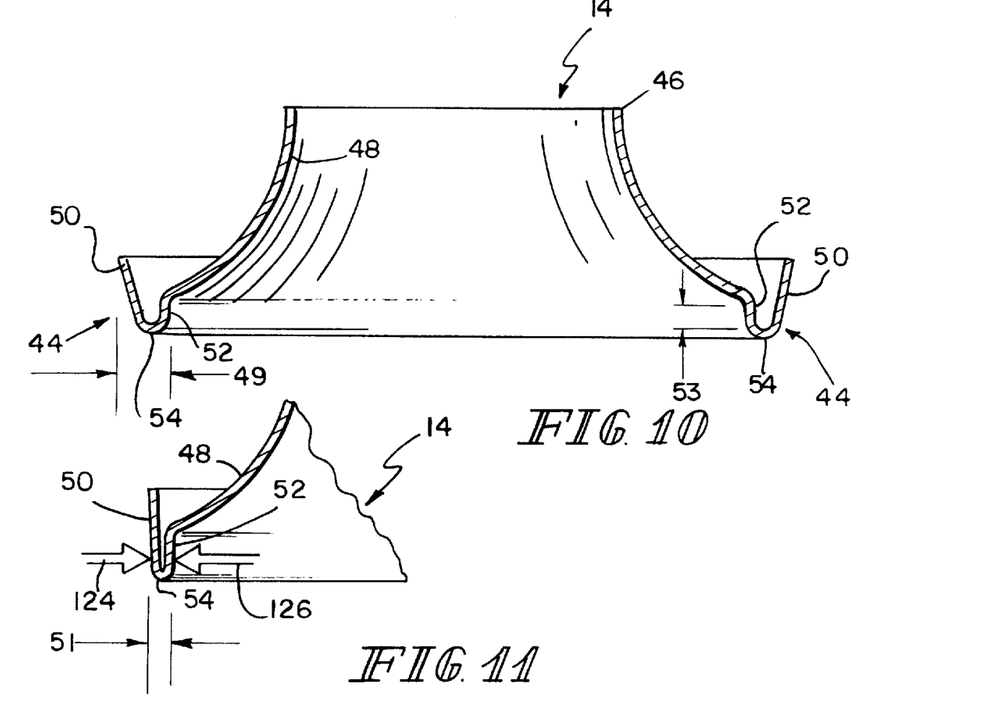
FIG. 10 is a sectional view, taken along line 10—10 of FIG. 8, of the end cap.
FIG. 11 is a partial sectional view of the end cap showing a force being applied to the crimpable flange of the end cap to move the crimpable flange to its crimped position.
Figure 12:
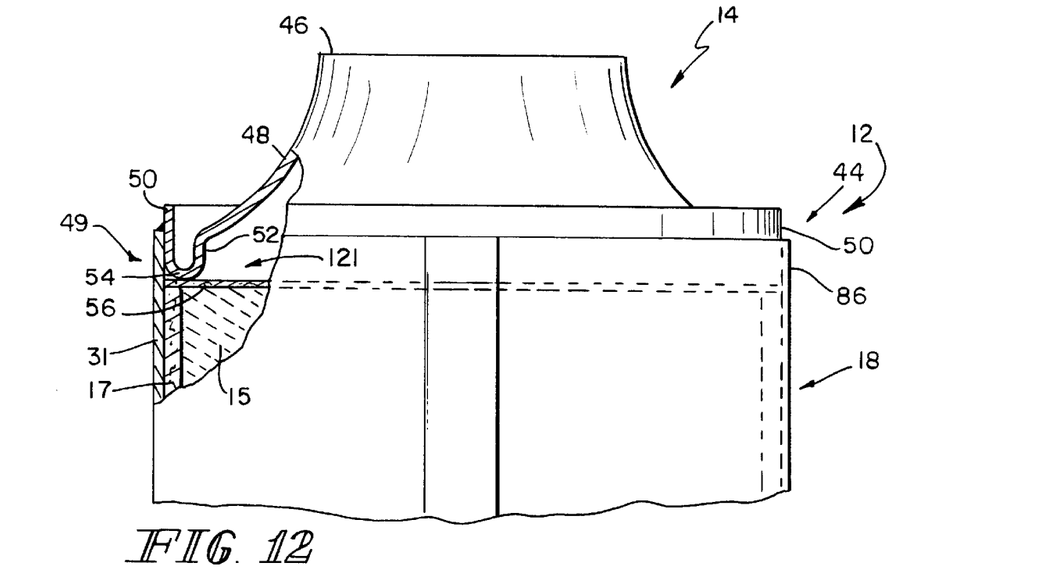
FIG. 12 is a partial side elevation view, with portions cutaway, showing a spacer being positioned to lie between the mat and substrate and the end cap.

Crimpable flange 20 includes a width 49 in the uncrimped position as shown, for example, in FIG. 10. When crimping force 58 is applied to first portion 26 and crimpable flange 20 is moved to a crimped position, as shown in FIG. 11, crimpable flange 20 includes a width 51 that is smaller than its uncrimped width 49. The width 51 is selected so that end cap 10 includes a diameter 62 that matches (i.e. corresponds to) inner diameter 122 of outer shell 31 of exhaust processor body 12 so that end cap 10 can be pushed into end cap region 121 of exhaust processor body 12. The first and second portions 50, 52 of crimpable flange 44 may be sized in any suitable manner.

The position controller 27 of end cap sizer 10 adjusts the amount of crimping force 58 applied to crimpable flange 44) to account for "spring-back" of first portion 50 of crimpable flange 44 after end cap 14, 16 is removed from end cap sizer 10. This adjustment for spring-back may allow for minor variations in material properties of end cap 14, 16. The spring-back adjustment can also be made by using either one of the means for accounting for the thickness of outer shell 31 described above. For example, the different diameter first and second regions 114, 118 of inner surface 38 of jaws 24 may be used to account for "springback" by measuring exhaust processor body 12 using the larger diameter region 114 and sizing end cap 10 using the smaller diameter region 118. In addition, the actuator 28 may move jaws 24 further in direction 90 so that jaws 24 close further in direction 45 around end cap 14, 16. Any one or combination of the above-mentioned means for accounting for spring-back may be used.

Because end cap 14, 16 can abut or be positioned to lie very close to mat 17 and substrate 15, mat 17 is not exposed to exhaust gas. The sizing of end cap 14, 16 provides virtually no gap between the outer surface of end cap 14, 16 and inner surface 112 of outer shell 31. This nonexistent or small gap between end cap 14, 16 and outer shell 31 permits end cap 14, 16 to be easily welded to outer shell 31. A spacer 56 such as "sizing paper" maybe placed on mat 16 and substrate 18 or on the end of crimpable flange 44 to set or otherwise fix the axial distance between end cap 10 and mat 17 and substrate 15. When end cap 10 abuts mat 17 and substrate 15, mat 17 is not exposed to mat-degrading exhaust gas passing through exhaust processor body 12. When end cap 10 is slightly spaced apart from mat 17 and substrate 15, mat 17 is isolated from the mat-degrading exhaust gas passing through exhaust processor body 12 to the extent that mat 17 will not be damaged by the exhaust gas.

The crimpable flange 44 is configured so that a crimping force 124, 126 may be applied to act upon first and second portions 50, 52, respectively, of crimpable flange 44 to obtain the desired diameter 62 of end cap 14 that matches (i.e. corresponds to) inner diameter 122 of exhaust processor body 12 as shown in FIG. 11. In one embodiment of the present invention, the second portion 52 of crimpable flange 44 is held stationary by a first mechanism (not shown) while a second mechanism (not shown) moves first portion 50 of crimpable flange 44 toward second portion 52. Second portion 52 of crimpable flange 44 is flat and includes a length 53 permit a mechanism or tool (not shown) to engage second portion 52 easily and hold second portion 52 stationary as another mechanism (not shown) engages first portion 50 of crimpable flange 44 and moves first portion 50 toward second portion 52 as shown in FIG. 11.

Another end cap 130 is shown in FIGS. 13 and 14. End cap 130 is identical to end cap 14 shown in FIGS. 6–12 except that end cap 130 includes a crimpable flange 132 that includes a first portion 134 that is different than first portion 50 of crimpable flange 44 of end cap 14. Crimpable flange 130 includes a second portion 136 and rounded end 138 that are identical to second portion 52 and rounded end 54 of crimpable flange 44. First portion 134 includes first and second walls 140, 142 that do not lie in the same plane. Compared to first portion 50 of crimpable flange 44, first portion 134 provides a different gripping surface for a crimping machine (not shown) to engage and a different gripping surface for contact with the inner surface 112 of outer shell 31.

Crimpable flange 132 includes a height 144 and a width 146 in the uncrimped position. When a crimping force 124, 126 is applied to one or both of first and second portions 134, 136 and crimpable flange 132 is moved to a crimped position, as shown in FIG. 14 (solid lines), crimpable flange 132 includes a height 148 that is greater than height 144 and a width 150 that is smaller than width 146. The width 150 is selected so that end cap 130 includes a diameter 152 that matches (i.e. corresponds to) inner diameter 122 of outer shell 31 of exhaust processor body 12 so that end cap 130 can be pushed into end cap region 121 of exhaust processor body 12.

As shown, for example, in FIGS. 13 and 14, end cap 130 includes an annular body portion 48 formed to include a narrow-diameter outer rim defining an axial outer opening 46, a larger-diameter inner rim defining an axially inner opening, and an exhaust product conductor passageway extending therebetween through annular body portion 48. End cap 130 further includes an annular flange support including an annular rounded end 138 and a cylindrical standoff 136 positioned to lie between and interconnect annular rounded end 138 and the larger-diameter inner rim of annular body portion 48 as shown, for example, in FIGS. 13 and 14. End cap 130 further includes a deformable annular flange 134, 142 coupled to annular rounded end 138 and arranged to surround cylindrical standoff 136 to form an annular channel lying therebetween and opening axially outwardly as shown, for example, in FIGS. 13 and 14. Deformable annular flange 134, 142 is movable relative to annular rounded end 138 from an expanded position shown in FIG. 13 to a deformed position shown in FIG. 14. As shown in FIG. 13, deformable annular flange includes a cylinder-shaped axially outer portion 134 defining first wall 140 and a cone-shaped axially inner portion 142.

The end cap sizer 10 and method of measuring exhaust processor body 12 and sizing end caps 14, 16 effectively measures an exhaust processor body 12 and sizes end caps 14, 16 to fit each unique exhaust processor body 12. The end cap sizer and method of measuring exhaust processor body 12 and sizing end caps 14, 16 can be used on exhaust processor bodies 12 that are not perfectly round or oval. By using jaws 24 configured to define an appropriate interior cavity 40, any shape of exhaust processor body 12 and end cap 14, 16 can be measured and sized, respectively.

Figure 15:
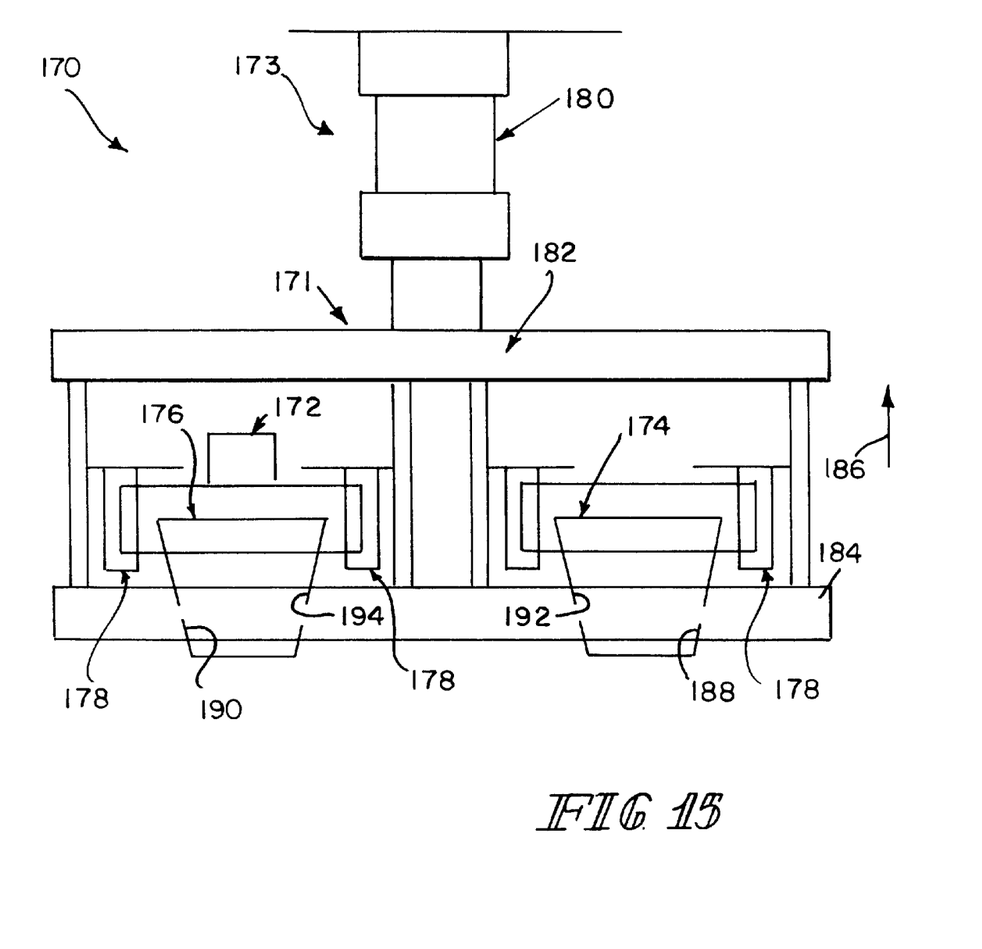
FIG. 15 is a schematic illustration of another end cap sizer for measuring and sizing components.

Another end cap sizer 170 is shown in FIG. 15. The end cap sizer 170 includes a device 171 that obtains a body measurement of a body 12 and sizes an end cap 14, 16 based on the body measurement and a control system 173 that moves device 171 to the necessary positions to receive body 12 and end cap 14, 16, obtain a measurement of exhaust processor body 12, and size end cap 14, 16. The device 171 includes an end cap manipulator or end cap jaws 174, a separate exhaust processor body measurer or body measure jaws 176, jaw supports 178 connected to end cap jaws 174 and body measure jams 176, and a reducing plate or jaw actuation plate 184. The control system 173 includes a load cell 172, an actuator 180, and a mechanical linkage 182.

The device 171 of end cap sizer 170 includes separate end cap jaws 174 and body measure jaws 176. The body measure jaws 176 and end cap jaws 174 are common reducing machines that are tooled with a set of outside jaws. To size an end cap 14, 16 based on the measurement of an exhaust processor body 12, an end cap 14, 16 is placed in end cap jaws 174 and an exhaust processor body 12 is placed in body measure jaws 176. The control system 173 closes the body measure jaws 176 to a given force about exhaust processor body 12 to measure exhaust processor body 12. The body measure jaws 176 communicate with end cap jaws 174 so that body measure jaws 176 determine the shape of exhaust processor body 12 and send information about tie exhaust processor body shape to end cap jaws 174 so that end cap jaws 174 can size end cap 14, 16 to fit exhaust processor body 12.

Body measure jaws 176 and end cap jaws 174 simultaneously measure exhaust processor body 12 and size an end cap 14, 16. To simultaneously measure exhaust processor body 12 and size an end cap 14, 16, actuator 180 moves jaw actuation plate 184 in direction 186 relative to jaws 174, 176. The actuation plate 184 is formed to include tapered side walls 192, 194 that define space-apart first and second apertures 188, 190. End cap jaws 174 and exhaust processor body measure jaws 176 are positioned to lie within first and second apertures 188, 190, respectively. The side walls 192, 194 are tapered so that as plate 184 moves in direction 186 relative to jaws 174, 176, side walls 192, 194 exert a force on end cap jaws 174 and exhaust processor body jaws 176, respectively, to measure exhaust processor body 12 and size end cap 14, 16, respectively. Actuator 180 moves plate 184 in direction 186 until load cell 172 measures that a predetermined amount of force is being applied to exhaust processor body 12.

Actuator 180 is a hydraulic power input cylinder. Actuator 180 could be any type of mechanism that causes jaws 174, 176 to open and close such as, for example, any of various electric, hydraulic, or pneumatic mechanisms. Mechanical linkage 182 can be any type of linkage that couples jaws 174, 176 and actuator 180.

Exhaust processor body measurer 176 is a conventional reducing machine tooled with a set of outside reducing jaws. The outside jaws 176 close to a given force about exhaust processor body 12 to measure the exhaust processor body 12. The jaws 176 may also remove irregularities of shape from exhaust processor body 12. The end cap manipulator 174 is a similar reducing machine with outside reducing jaws and inside fingers.

The exhaust processor body measurer 176 and end cap manipulator 174 account for the thickness of outer shell 31 of converter body 12 because end cap 14, 16 has to be sized to fit with outer shell 31 of converter body 12 as shown in FIG. 7. In addition, spring back of the crimpable flange 44 of end cap 14, 16 may be considered when sizing end cap 14, 16.

The end cap 14, 16 is sized by end cap sizer 170 by performing the following steps:
1. load exhaust processor body 12 into exhaust processor body jaws 176,
2. load end cap 14, 16 into end cap jaws 174,
3. control system 173 closes exhaust processor body jaws 176 and end cap jaws 174 by actuator 180 moving jaw actuation plate 184 in direction 186 relative to jaws 174, 176,
4. the exhaust processor body jaws 176 and end cap jaws 174 close until a preset force is detected on exhaust processor body 12 by load cell 172 and end cap jaws 174 size end cap 14, 16 to match exhaust processor body 12 and create a matching end cap 14, 16 and exhaust processor body 12, and when the preset force has been reached, control system 173 opens jaws 174, 176 to permit exhaust processor body 12 and end cap 14, 16 to be removed from end cap sizer 170.

Although the invention is not limited only to the field of sizing end caps to fit exhaust processor bodies, this is an application for which the invention is especially suitable, as it can effectively size the end caps to fit each unique exhaust processor body. Although this invention has been described in detail with reference to certain embodiments, variations and modifications exist within the scope and spirit of the invention as described and as defined in the following claims.

What is claimed is:

1. An exhaust processor comprising an exhaust processor body including an outer shell and a substrate positioned to lie within the outer shell and in spaced-apart relation to a first axially outer edge of the outer shell to define a first end cap region located within the outer shell and bounded by a cylindrical inner surface of the outer shell and a first end cap including an annular body portion formed to include an outer rim defining an axially outer opening, an inner rim defining an axially inner opening, and an exhaust product conductor passageway extending therebetween to communicate with a first end face of the substrate, an annular flange support including an annular rounded end and a cylindrical standoff positioned to lie between and interconnect the annular rounded end and the inner rim, and a deformable annular flange coupled to the annular rounded end and arranged to surround the cylindrical standoff to form an annular channel lying therebetween and opening axially outwardly away from the substrate, the deformable annular flange being movable relative to the annular rounded end from an expanded position wherein the outer diameter of the deformable annular flange is greater tan the inner diameter of the cylindrical inner surface of the outer shell to a deformed position wherein the annular rounded end is positioned to lie in the first end cap region and an outer mating surface of the deformable annular flange mates with the cylindrical inner surface of the outer shell to mount an axially inner portion of the first end cap in the first end cap region formed within the outer shell.

2. The exhaust processor of claim 1, wherein the deformable annular flange includes an axially outer portion defining a first wall and an axially inner portion interconnecting the axially outer portion and the annular rounded end and defining a second wall and the first wall includes the outer mating surface.

3. The exhaust processor of claim 2, wherein the axially outer portion is cylinder-shaped.

4. The exhaust processor of claim 3, wherein the axially inner portion is cone-shaped.

5. The exhaust processor of claim 2, wherein the axially inner portion is cone-shaped and the second wall diverges in a direction extending away from the substrate.

6. The exhaust processor of claim 5, wherein the axially inner portion surrounds the cylindrical standoff and the axially outer portion surrounds an axially inner portion of the annular body portion.

7. The exhaust processor of claim 1, wherein the deformable annular flange is formed to have a cone-shaped configuration when in the expanded position and to have a cylinder-shaped configuration when in the deformed position.

8. The exhaust processor of claim 7, wherein an axially outer portion of the deformable annular flange lies within the first end cap region formed within the outer shell.

9. The exhaust processor of claim 1, wherein the annular rounded end faces toward the substrate.

10. The exhaust processor of claim 9, wherein the annular rounded end abuts the substrate.

11. The exhaust processor of claim 1, further comprising a spacer positioned to lie between the annular rounded end and tie substrate.

12. The exhaust processor of claim 11, wherein the spacer is made of a paper material and sized to fix an axial distance between the first end cap and the substrate.

13. The exhaust processor of claim 1, further comprising a mat made of an intumescent material and positioned to lie between the outer shell and the substrate and the first end cap cooperates with the substrate to block exhaust product flowing through the exhaust product conductor passageway into the substrate from reaching the mat.

14. The exhaust processor of claim 13, wherein the annular rounded end abuts the substrate.

15. The exhaust processor of claim 14, wherein the annular rounded end also abuts the mat.

16. The exhaust processor of claim 13, further comprising a spacer positioned to lie below the annular rounded end and above the substrate and the mat.

17. The exhaust processor of claim 16, wherein the spacer abuts each of the annular rounded end, the substrate, and the mat.

18. The exhaust processor of claim 1, wherein the substrate is positioned to lie in spaced-apart relation to a second axially outer edge of the outer shell to define a second end cap region located within the outer shell and bounded by a second cylindrical inner surface of the outer shell and the substrate further includes a second end face positioned to lie in spaced-apart relation to the first end face at an opposite end of the substrate and further comprising a second end cap formed to include a second exhaust conductor passageway communicating with the second end face and a second deformable annular flange positioned to mate with the second cylindrical inner surface of the outer shell to mount an axially inner portion of the second end cap in Dee second end cap region formed within the outer shell.

19. The exhaust processor of claim 18, further comprising a mat made of an intumescent material and positioned to lie between the outer shell and the substrate, and wherein the first end cap abuts the first end face of the substrate and the second end cap abuts the second end face of the substrate to block exhaust product flowing through the first and second exhaust conductor passageways and the substrate from reaching the mat.

20. The exhaust processor of claim 18, further comprising a mat made of an intumescent material and positioned to lie between the outer shell and the substrate, a first spacer positioned to lie between the first end cap and the first end face of the substrate, and a second spacer positioned to lie between the second end cap and the second end face of the substrate, and wherein the first end cap abuts the first spacer and the second end cap abuts the second spacer to block exhaust product flowing through the first and second exhaust conductor passageways and the substrate from reaching the mat.

21. The exhaust processor of claim 1, wherein the substrate is positioned to lie in spaced-apart relation to a second axially outer edge of the outer shell to define a second end cap region located within the outer shell and bounded by a second cylindrical inner surface of the outer shell and a second end cap including a second annular body portion formed to include a second outer rim defining a second axially outer opening, a second inner rim defining a second axially inner opening, and a second exhaust product conductor passageway extending therebetween to communicate with a second end face of the substrate, a second annular flange support including a second annular rounded end and a second cylindrical standoff positioned to lie between and interconnect the second annular rounded end and the second inner rim, and a second deformable annular flange coupled to the second annular rounded end and arranged to surround the second cylindrical standoff to form a second annular channel lying therebetween and opening axially outwardly away from the substrate, the second deformable annular flange being movable relative to the second deformable annular flange is greater than the inner diameter of the second cylindrical inner surface of the outer shell to a deformed position wherein the second annular rounded end is positioned to lie in the second end cap region and an outer mating surface of the second deformable annular flange mates with the second cylindrical inner surface of the outer shell to mount an axially inner portion of the second end cap in the second end cap region formed within the outer shell.

22. An exhaust processor comprising
an exhaust processor body including an outer shell, a substrate positioned to lie within the outer shell and in spaced-apart relation to a first axially outer edge of the outer shell to define a first end cap region located within the outer shell and to an opposite second axially outer edge of the outer shell to define an opposite second end cap region located within the outer shell, and a mat made of an intumescent material positioned to lie between the outer shell and the substrate and around the substrate,
a first end cap formed to include a first inlet, first outlet, and first exhaust product conductor passageway interconnecting the first inlet and the first outlet, the first end cap being coupled to the outer shell to mount the first outlet in the first end cap region and to block flow of exhaust product passing from the first exhaust product conductor passageway into the substrate from reaching the mat, and
a second end cap formed to include a second inlet, second outlet, and second exhaust product conductor passageway interconnecting the second inlet and the second outlet, the second end cap being coupled to the outer shell to mount the second inlet in the second end cap region and to block flow of exhaust product passing from the substrate into the second exhaust product conductor passageway from reaching the mat to isolate the mat in the outer shell from communication with said exhaust product flowing through the substrate.

23. The exhaust processor of claim 22, wherein the first end cap abuts the substrate.

24. The exhaust processor of claim 23, wherein the substrate includes a first end face and the first end cap abuts the first end face.

25. The exhaust processor of claim 23, wherein the first end cap also abuts the mat.

26. The exhaust processor of claim 22, further comprising a spacer positioned to lie between the first end cap and the substrate and the first end cap abuts the spacer.

27. The exhaust processor of claim 26, wherein the spacer is made of a paper material and sized to fix an axial distance between the first end cap and the substrate.

28. The exhaust processor of claim 26, wherein the substrate includes a first end face, the first end cap abuts one side of the spacer, and the mat and first end face abut another side of the spacer.

* * * * *